US011633789B2

(12) United States Patent
Lara-Curzio et al.

(10) Patent No.: US 11,633,789 B2
(45) Date of Patent: Apr. 25, 2023

(54) COMPLIANT HEAT EXCHANGERS, HEAT PIPES AND METHODS FOR MAKING SAME

(71) Applicant: UT-Battelle, LLC, Oak Ridge, TN (US)

(72) Inventors: Edgar Lara-Curzio, Oak Ridge, TN (US); Corson L. Cramer, Oak Ridge, TN (US); Amelia M. Elliott, Oak Ridge, TN (US); Brian A. Fricke, Oak Ridge, TN (US); Prashant K. Jain, Oak Ridge, TN (US); Richard R. Lowden, Oak Ridge, TN (US); Kashif Nawaz, Oak Ridge, TN (US); Vivek M. Rao, Oak Ridge, TN (US); Matthew J. Sandlin, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 66 days.

(21) Appl. No.: 17/171,323

(22) Filed: Feb. 9, 2021

(65) Prior Publication Data

US 2021/0245246 A1    Aug. 12, 2021

Related U.S. Application Data

(60) Provisional application No. 62/972,177, filed on Feb. 10, 2020.

(51) Int. Cl.
*B22F 10/20* (2021.01)
*F28D 15/04* (2006.01)
(Continued)

(52) U.S. Cl.
CPC ............... *B22F 10/20* (2021.01); *B22F 5/10* (2013.01); *B33Y 10/00* (2014.12); *B33Y 80/00* (2014.12);
(Continued)

(58) Field of Classification Search
CPC ........ B22F 10/20; B22F 5/10; B22F 2998/10; B22F 7/004; B22F 10/28; B22F 5/106;
(Continued)

(56) References Cited

U.S. PATENT DOCUMENTS 10,704,845 B2 *   7/2020   Chipko ............... B21C 37/0807
10,746,326 B2 *   8/2020   Custer ...................... F16L 9/19
(Continued)

*Primary Examiner* — Lawrence Averick
(74) *Attorney, Agent, or Firm* — Warner Norcross + Judd LLP

(57) ABSTRACT

A method for fabricating heat exchangers using additive manufacturing technologies. Additive manufacturing enables the manufacture of heat exchangers with complex geometries and/or with internal and external integral surface features. Additive manufacture also facilitates the manufacture of heat exchangers with regional variations, such as changes in size, shape and surface features. In one embodiment, the present invention provides a heat exchanger with a helicoidal shape that provides axial elastic compliance. In one embodiment, the internal channel of the heat exchanger varies along its length. The internal channel may have a cross-sectional area that increases progressively from one end to the other. In one embodiment, the external shape of the tubular structure may be non-circular to optimize heat transfer with an external heat transfer fluid. In one embodiment, the present invention provides a heat pipe with an internal wicking structure formed as an integral part of the additive manufacturing process.

2 Claims, 5 Drawing Sheets

(51) Int. Cl.
  *F28D 15/02* (2006.01)
  *B22F 5/10* (2006.01)
  *B33Y 80/00* (2015.01)
  *B33Y 10/00* (2015.01)

(52) U.S. Cl.
  CPC ....... *F28D 15/0233* (2013.01); *F28D 15/046* (2013.01); *B22F 2998/10* (2013.01); *F28F 2255/18* (2013.01)

(58) Field of Classification Search
  CPC ..... B33Y 10/00; B33Y 80/00; F28D 15/0233; F28D 15/046; F28F 2255/18; F28F 1/422; F28F 13/08; Y02P 10/25
  See application file for complete search history.

(56) References Cited

U.S. PATENT DOCUMENTS

| | | | |
|---|---|---|---|
| 11,415,380 B2* | 8/2022 | Chipko | B33Y 10/00 |
| 2017/0315161 A1* | 11/2017 | Lopez Ramos | G01R 17/02 |
| 2018/0283795 A1* | 10/2018 | Cerny | F28D 1/0472 |
| 2019/0211949 A1* | 7/2019 | Custer | F16L 9/19 |
| 2019/0234697 A1* | 8/2019 | Chipko | B21C 23/085 |
| 2020/0132335 A1* | 4/2020 | Forest | F28F 1/30 |
| 2020/0278160 A1* | 9/2020 | Chipko | F28F 1/04 |

* cited by examiner

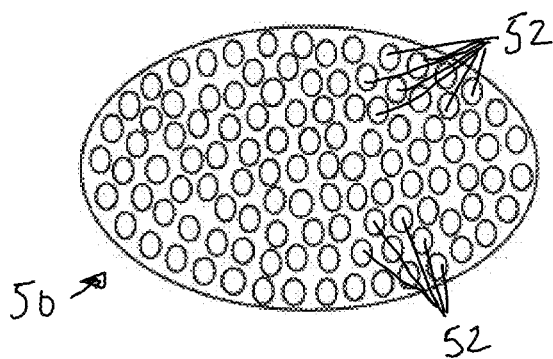
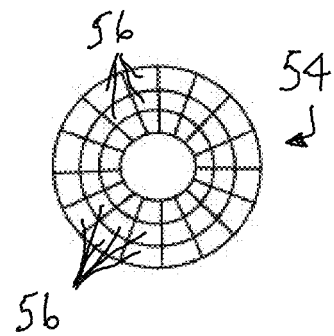
Fig. 9          Fig. 10
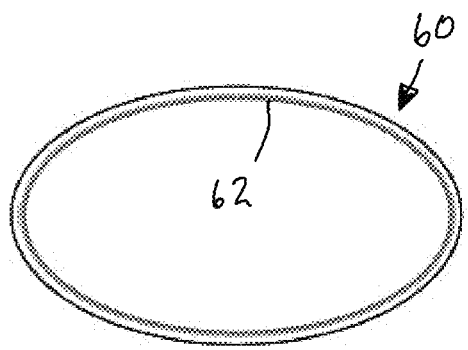
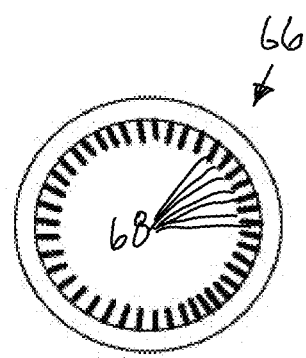
Fig. 11          Fig. 12
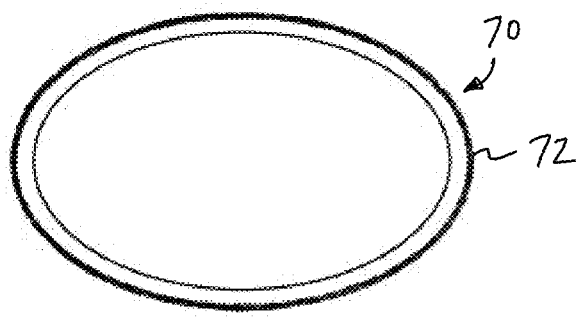
Fig. 13

COMPLIANT HEAT EXCHANGERS, HEAT PIPES AND METHODS FOR MAKING SAME

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present invention relates to thermal management components, and more particularly to heat exchangers and heat pipes for transferring heat between fluids.

BACKGROUND OF THE INVENTION

A wide range of energy conversion technologies and industrial processes depend on thermal management components, such as heat exchangers and heat pipes, for transferring heat between fluids. To implement energy conversion technologies and processes, there is a need for durable and reliable thermal management components with high-effectiveness and efficiency in the chemical, industrial and energy industries. The durability of these heat transfer components is often dictated by their resistance to extreme conditions of temperature, pressures and environments, including temperature gradients under mechanical constraints.

One of the most common modes of failure experienced by heat exchangers is constrained thermal fatigue, which occurs when stresses that arise from repeated constrained thermal expansion/contraction, i.e., thermally-induced stresses, lead to the nucleation and growth of strength-limiting flaws.

In addition to efforts to improve the reliability and durability of thermal management components, there are ongoing efforts to develop thermal management components that have improved heat transfer characteristics, including improved heat transfer efficiency. Conventional methods for manufacturing heat exchangers are limited in their ability to produce complex geometries in a cost-effective manner.

In view of the foregoing, there is an ongoing need for improved thermal management components, such as heat exchangers, including single phase heat exchangers and multiphase heat pipes, that are durable and reliable with high-effectiveness and efficiency, as well as method for manufacturing the same.

SUMMARY OF THE INVENTION

The present invention provides a method for fabricating thermal management components, including heat exchangers and heat pipes, using additive manufacturing technologies. Additive manufacturing enables the manufacture of heat exchangers with complex geometries and/or with internal and external surface features that cannot readily be attained with conventional manufacturing methods. Additive manufacture also facilitates the manufacture of heat exchangers with regional variations, such as changes in size, shape and surface features along the length of the heat exchanger.

In one embodiment, the present invention provides a method for fabricating heat exchangers from polymeric, metallic, glass, ceramic or composites containing plastic, metallic and ceramic phases using additive manufacturing including, but not limited to, binder jetting, fused deposition, or energy-directed melting of metals, glasses, ceramics or composites. The method includes selecting materials for manufacturing the heat exchangers based, at least in part, on the temperatures of operation, and by the material's thermal conductivity, mechanical strength as well as other mechanical and chemical properties, such as corrosion, creep, and fatigue resistance. Because of the feasibility of fabricating these structures with such a wide range of materials, it is possible to select materials that would be resistant to specific operating conditions.

In one embodiment, the method includes the step of manufacturing a heat exchanger with a helicoidal geometry. For example, the heat exchanger may be manufactured with a tube-like structure defining an internal channel that follows a helical or spiral path. In such embodiments, the present invention can be used to reduce the propensity of heat exchangers to fail by thermal fatigue or constrained thermal expansion by using a helicoidal tubular structure that exhibits axial elastic compliance. In some embodiments, the cross-section shape of the helicoidal structure can be selected to enhance axial elastic compliance of the heat exchanger. The axial elastic compliance can be used to accommodate axial deformations induced by temperature gradients and thermal loads. Consequently, the use of a helicoidal geometry may allow the heat exchanger to exhibit resistance to strained thermal expansion and potentially preventing constrained thermal fatigue.

In one embodiment, the method includes fabricating a helicoidal tubular structure by additive manufacturing in which the cross-section (e.g. cross-sectional shape and/or cross-sectional area), varies along the length of the structure length. For example, in one embodiment, the heat exchanger may be manufactured with an internal channel with a progressively greater cross-sectional area from one end to the other. This enables the fabrication of heat exchangers with high effectiveness and high efficiency by minimizing pressure drop of fluids flowing along the internal channel of the structure.

In one embodiment, the method includes fabricating the heat exchanger with an internal channel having an inner surface with texturing or internal structures that are selected to enhance performance, for example, to enhance heat transfer. The texturing and internal structures may be formed as an integral part of the additive manufacturing process.

In one embodiment, the method may be further defined as a method for manufacturing a multiphase heat pipe and the method may include the step of forming a wicking layer on the inner surfaces of the heat exchanger. The wicking layer may be configured to move a working fluid in liquid phase through capillary action. In one embodiment, the wicking layer is formed as an integral part of an additive manufacturing process. In additive manufacturing processes that involves powder sintering, the wicking layer may be formed by partial sintering of the powder along the inner surfaces of the heat exchanger.

In one embodiment, the method includes the step of forming the external shape of the heat exchanger to maximize heat transfer by convection and/or radiation, or to reduce drag of the external fluid (liquid or gas). In one embodiment, the external shape is configured, in part, based on the characteristics of the external fluid and its direction of flow relative to the heat exchanger. The method may include varying the external shape along the length of the heat exchanger.

In one embodiment, the method includes the step of forming the external surface of the heat exchanger with texturing or external structures that are selected to enhance performance, for example, to enhance heat transfer. The texturing and external structures may be formed as an integral part of the additive manufacturing process.

In another aspect, the present invention provides a heat exchanger that has a variable cross-section along its length. More specifically, characteristics, such as the size and cross-sectional shape, of the heat exchanger may be tailored along its length to provide the heat exchanger with the desired characteristics. For example, the size and shape may be varied along the length to maximize heat transfer by radiation and convection, and to minimize pressure drop inside the tubular structure. The characteristics of the cross-section can be varied as an integral part of an additive manufacturing method.

In one embodiment, the heat exchanger has a helicoidal tubular structure having a variable cross-section along the helix. For example, the size and shape may be varied along the helix to enhance one or more properties of the heat exchanger. Because of its helicoidal shape, the helicoidal heat exchanger exhibits intrinsic axial elastic compliance. This axial elastic compliance can be used to accommodate axial deformations induced by temperature gradients and thermal loads. Because of this, the structure will exhibit resistance to constrained expansion and therefore, resistance to constrained thermal fatigue, which is one of the common modes of failure of heat exchangers. In one embodiment, the tubular structure has an inner channel with a cross-sectional area that progressively increases from the inlet end to the outlet end. The tubular structure may be helical or have other shapes.

In one embodiment, the helicoidal tubular structure has an inner channel and the inner surfaces of the internal channel are textured to maximize heat transfer rate. The texturing may vary within the structure, for example, along its length and/or about its axis. Texturing on the inner surfaces can be formed as an integral part of an additive manufacturing method.

In one embodiment, the helicoidal tubular structure has an inner channel and the inner surfaces of the internal channel include structures. The size, shape and configuration of structures may be selected to maximize heat transfer rate. The structures may vary within the structure, for example, along its length and/or about its axis. The internal structures can be formed as an integral part of an additive manufacturing method.

In one embodiment, the inner channel is partitioned into microchannels to enhance heat transfer. The microchannels may be formed as an integral part of an additive manufacturing method. For example, the inner channel may be subdivided into a plurality of separate channels. The number and paths of the microchannels may be configured to optimize the performance of the heat exchanger for its corresponding application. The number, size, shape and arrangement of microchannels may vary along the length of the inner channel.

In one embodiment, the external shape of the helicoidal structure is selected to maximize heat transfer by convection and/or radiation, or to reduce drag of the external fluid (liquid or gas). For example, the external shape may be configured, in part, based on the characteristics of the external fluid and its direction of flow relative to the heat exchanger. The external shape of the helicoidal structure may vary along its length, for example, to change the heat transfer characteristics along the length of the heat exchanger. The external shape of the helicoidal structure may be formed as an integral part of an additive manufacturing method.

In one embodiment, the helicoidal heat exchanger is manufactured using an additive manufacturing process. For example, the heat exchanger may be fabricated from polymeric, metallic, glass, ceramic or composite material structures using binder jetting, fused deposition, or energy-directed melting of metals, glasses, ceramics or composites.

In another aspect, the present invention provides a helicoidal tubular structure with variable cross-section along the length of the helix to maximize heat transfer by radiation and/or convection and/or to minimize pressure drop inside the tubular structure. The inner surfaces of the internal channel can be textured or include internal structures, as part of the additive manufacturing method, to increase surface area and maximize heat transfer rate. The inner channel can be partitioned into microchannels to further enhance heat transfer. The external shape of the helicoidal structure could be selected to maximize heat transfer by convection and/or radiation, or to reduce drag of the external fluid. Further, the external surface may be textured or may include microstructures.

These and other features of the invention will be more fully understood and appreciated by reference to the description of the embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 9 is a representational cross-section of a tubular structure having microchannels.

FIG. 10 is a representational cross-section of an alternative tubular structure having alternative microchannels.

FIG. 11 is a representational cross-section of a tubular structure having internal texturing.

FIG. 12 is a representational cross-section of a tubular structure having internal structures.

FIG. 13 is a representational cross-section of a tubular structure having external texturing.

DESCRIPTION OF CURRENT EMBODIMENTS

Overview.

Figure 1:
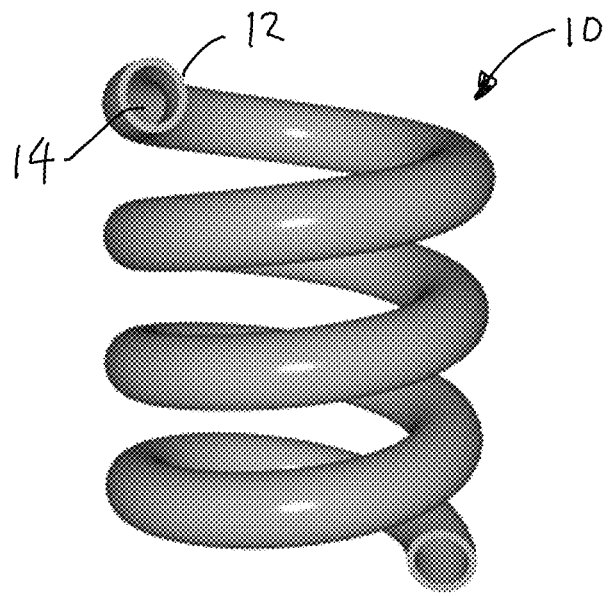
FIG. 1 is an illustration of an exemplary helicoidal tubular structure with constant pitch and constant cross section.
Figure 2:
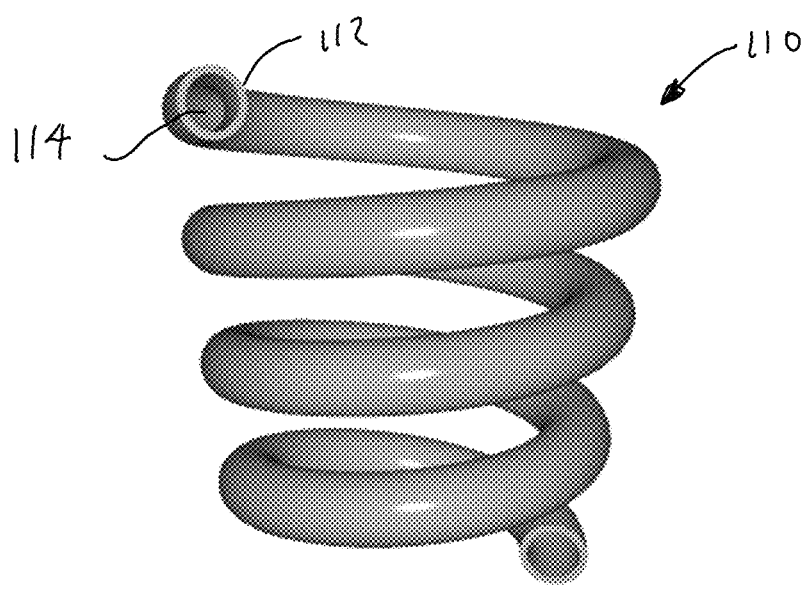
FIG. 2 is an illustration of an exemplary helicoidal heat exchanger in which the helix dimensions change along its length.
Figure 3:
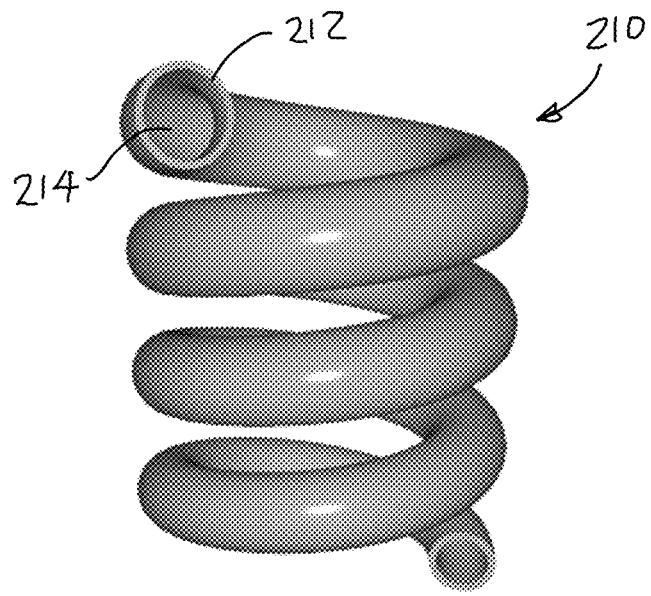
FIG. 3 is an illustration of an exemplary helicoidal structure in which the dimensions of the internal channel change along the length of the helix.
Figure 4:
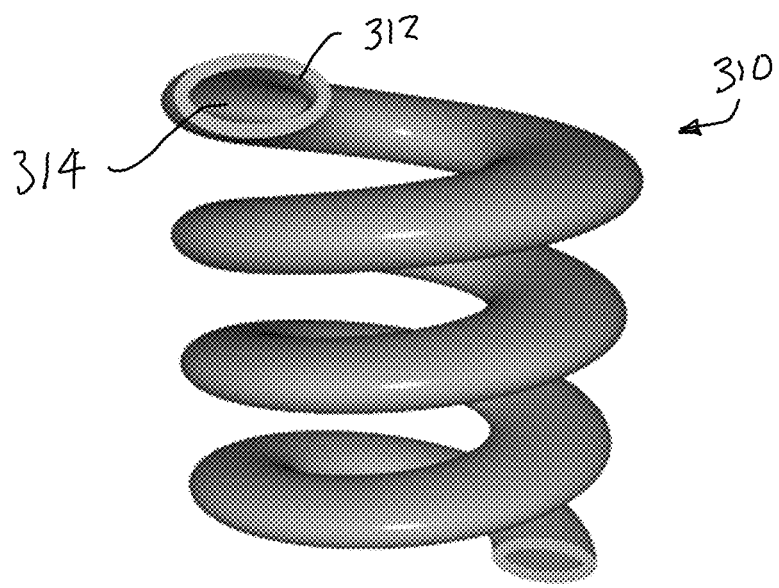
FIG. 4 is an illustration of an exemplary helicoidal structure with a non-circular cross-section in which the dimensions of the internal channel change along the length of the helix.

A heat exchanger in accordance with an embodiment of the present invention is shown in FIG. 1, and generally designated 10. The heat exchanger 10 of FIG. 1 has a helicoidal tube-like structure 12 defining an internal channel 14. In some embodiments of the present invention, the characteristics of the tube-like structure 12 and/or the internal channel 14 are varied along the length of the heat exchanger 10. For example, FIG. 2 shows a heat exchanger 110 in which the radius of the helix increases progressively from one end to the other. In some embodiments, the cross-sectional shape of the internal channel 14 varies along the length of the helix. For example, FIG. 3 shows a heat exchanger 210 in which the diameter of the inner channel 14 increases progressively from one end to the other. As another example, FIG. 4 shows a heat exchanger 310 in which cross-sectional shape is non-circular and increases in area from one end to the other. The present invention provides a heat exchanger that is optimized for its particular application. In some embodiments, the configuration of the heat exchanger is tailored to maximize heat transfer and minimize pressure drop.

The present invention also provides a method for manufacturing heat exchangers in which the heat exchanger is manufactured using additive manufacturing. In accordance with the present invention, a heat exchanger may be manufactured from polymeric, metallic, glass, ceramic or composite material structures using additive manufacturing including, but not limited to: binder jetting, fused deposition, or energy-directed melting of metals, glasses, ceramics or composites. In connection with this method, the optimal heat exchanger design can be determined computationally using conventional heat exchanger modeling algorithms. For example, conventional modeling algorithms can be used to provide an optimized heat exchanger design that varies along its length to provide enhanced heat transfer with reduced pressure drop. The computational algorithms can take into account not only the fluid passing through the heat exchanger, but also any external fluid that may be passing over the exterior of the heat exchanger.

For purposes of this application, the term "heat exchanger" is used broadly to refer to essentially all single phase and multiphase heat exchangers, and is not limited to the specific types of heat exchangers shown and described herein. The present invention can be incorporated into any essentially all types of heat exchangers, including single phase heat exchangers and multiphase heat pipes, and may, in different embodiments, be incorporated into a wide range of alternative thermal management components.

Thermal Management Components.

The figures illustrate alternative embodiments of the present invention using similar reference numerals to denote corresponding structures in the different embodiments. More specifically, reference numerals that match in both the tens and ones places designate corresponding structure in the different illustrated embodiment. A difference in the digit in the hundreds place or the addition of the prime symbol ("'") to the end of a reference numeral designates different embodiments. By way of example, reference numerals with "12" in the tens and ones place, such as 12, 112, 212, 312, 412, 512, 512', 612 and 612', denote the external surface of the tube-like structure in the various embodiments. Similarly, reference numerals with "14" in the tens and ones place, such as 14, 114, 214, 314, 414, 514, 514', 614 and 614', denote the internal channel in the various embodiments.

In a first aspect, the present invention is directed to a heat exchanger with an enhanced geometry. The heat exchanger 10 of FIG. 1 is a single phase heat exchanger having a tube-like structure 12 that defines an internal channel 14 providing a flow path for a fluid (e.g. gas or liquid). In this embodiment, the heat exchanger 10 has a constant pitch, constant diameter and the cross-section of the internal channel 14 does not vary. In this embodiment, the heat exchanger 10 has a helicoidal tubular structure that allows the heat exchanger 10 to exhibit axial elastic compliance. This axial elastic compliance can be used to accommodate axial deformations induced by temperature gradients and thermal loads. The heat exchanger 10 of this embodiment is manufactured using additive manufacturing, which permits fabrication of a helicoidal structure from a wide range of materials, including plastics, metals, ceramics and composites containing plastic, metallic and ceramic phases. Because of the feasibility of fabricating heat exchangers with such a wide range of materials, it is possible to select materials that are resistant to specific operating conditions, such as temperature extremes and fluid properties.

In the embodiment of FIG. 2, the heat exchanger 110 has a tube-like structure 112 that defines an internal channel 114 providing a flow path for a fluid. In this embodiment, the heat exchanger 110 is helicoidal and both the diameter and pitch of the helix increase progressively from one end to the other. It should be understood that the diameter and pitch of the heat exchanger 110 need not vary progressively, but either may instead vary arbitrarily to provide the heat exchanger with desired performance characteristics. As with heat exchanger 10, heat exchanger 110 may be manufactured using additive manufacturing.

FIG. 3 shows another alternative heat exchanger 210. In this embodiment, the heat exchanger 210 has a tube-like structure 212 that defines an internal channel 214 providing a flow path for a fluid. In this embodiment, the heat exchanger 210 is helicoidal and the cross-sectional diameter of the tube-like structure 212 and the internal channel 214 increase progressively from one end to the other. Pressure drop may be minimized by changing the size of the hydraulic diameter along the length of the helix. It should be understood that the diameters of the tube-like structure 212 and the internal channel 214 need not vary progressively, but may instead vary arbitrarily to provide the heat exchanger with desired performance characteristics. Further, the diameter of the tube-like structure 212 and the internal channel 214 need not vary together. Instead, their diameters may vary individually, which can result in variations in the wall thickness of tube-like structure 212. Heat exchanger 210 may be manufactured using additive manufacturing.

Another alternative embodiment of the present invention is shown in FIG. 4. The heat exchanger 310 of FIG. 4 has a tube-like structure 312 that defines an internal channel 314 providing a flow path for a fluid. In this embodiment, the internal channel 314 has a non-circular cross-section. The illustrated non-circular cross-section is merely exemplary and the internal channel 314 may have essentially any circular or non-circular cross-section. Further, the cross-sectional shape of the internal channel 314 may vary along the length of the tube-like structure 312. For example, the internal channel 314 may transition from one non-circular cross-section to another or from a non-circular cross-section to a circular cross-section. In this embodiment, the diameter of the helix, as well as the cross-sectional diameter of the tube-like structure 312 and the internal channel 314 increase progressively from one end to the other. Pressure drop may be minimized by changing the size of the hydraulic diameter along the length of the helix. At the same time, by using non-circular cross sections it is possible to maximize surface area to increase heat transfer by both convection and radiation. It should be understood that the diameter of the helix and the diameters of the tube-like structure 312 and the internal channel 314 need not vary progressively, but may instead vary arbitrarily to provide the heat exchanger with desired performance characteristics. Further, the diameter of the tube-like structure 312 and the internal channel 314 need not vary together. Instead, their diameters may vary individually, which can result in variations in the wall thickness of tube-like structure 312. As with the embodiments of FIGS. 1-3, heat exchanger 310 may be manufactured using additive manufacturing.

In an alternative embodiment, the heat exchanger 10, 110, 210 and 310 may include internal microchannels to enhance or otherwise tailor heat transfer. For example, the internal channel 14, 114, 214 and 314 may be subdivided into a plurality of microchannels. FIG. 9 is a representative cross-section of a heat exchanger 50 showing one embodiment of microchannels 52. FIG. 10 is a representative cross-section of an alternative heat exchanger 54 showing an alternative arrangement of microchannels 56. In some embodiments, the microchannels may extend in parallel from one end of the structure to the other. In alternative applications, the size, shape and arrangement of microchannels may vary along the length of the structure. For example, the size of microchannels may vary along the length of structure with some microchannels. As another example, the microchannels may vary position with respect to one another (e.g. twist about each) along the length of the heat exchanger 10. The characteristics of the microchannels may vary from application to application, for example, the number, size, shape and arrangement of microchannels may be selected to meet the objectives of the corresponding application.

In another alternative embodiment, the heat exchanger 10, 110, 210 and 310 may include texturing to enhance heat transfer. The texturing may be provided on the inner surfaces of the tube-like structure 12, 112, 212 and 312 that defines the internal channel 14, 114, 214, and 314. For example, FIG. 11 is a representative cross-section of a heat exchanger 60 with texturing 62 on its inner surfaces. In the illustrated embodiment, the texturing is formed as an integral part of the additive manufacturing process. In some applications, a uniform layer of texturing may cover the entire inner surface of the tube-like structure 12, 112, 212 and 312. In other applications, the texturing may vary, for example, along the length or about the axis of the tube-like structure 12, 112, 212 and 312. This may help to provide localized or regional control over heat transfer and pressure drop.

In one alternative embodiment, the heat exchanger 10, 110, 210 and 310 may include internal structures that provide enhanced heat transfer or other performance enhancements. For example, the internal structures may be configured to increase the surface area of engagement between the internal fluid and the heat exchanger. FIG. 12 is a representative cross-section of a heat exchanger 66 showing internal structures in the form of fins 68. The internal structures may be formed as an integral part of the additive manufacturing process. In some applications, a uniform pattern of internal structures may line the inner surface of the tube-like structure 12, 112, 212 and 312. In other applications, the internal structures may vary, for example, along the length or about the axis of the tube-like structure 12, 112, 212 and 312.

Figure 7:
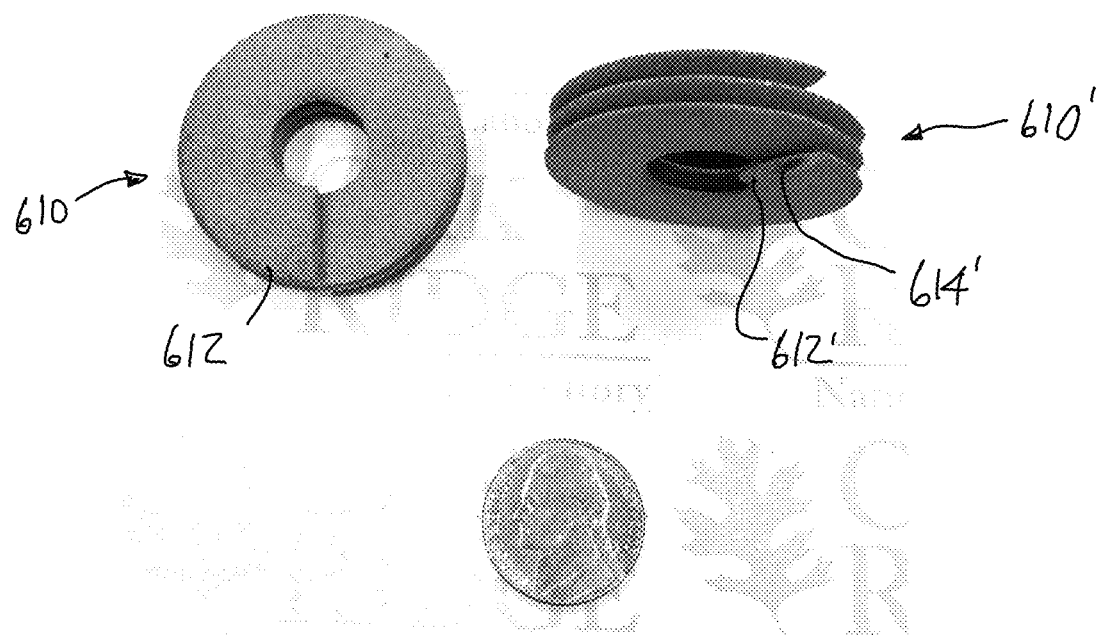
FIG. 7 is an image of two exemplary metallic helicoidal structures fabricated by laser melt deposition of molybdenum.
Figure 8:
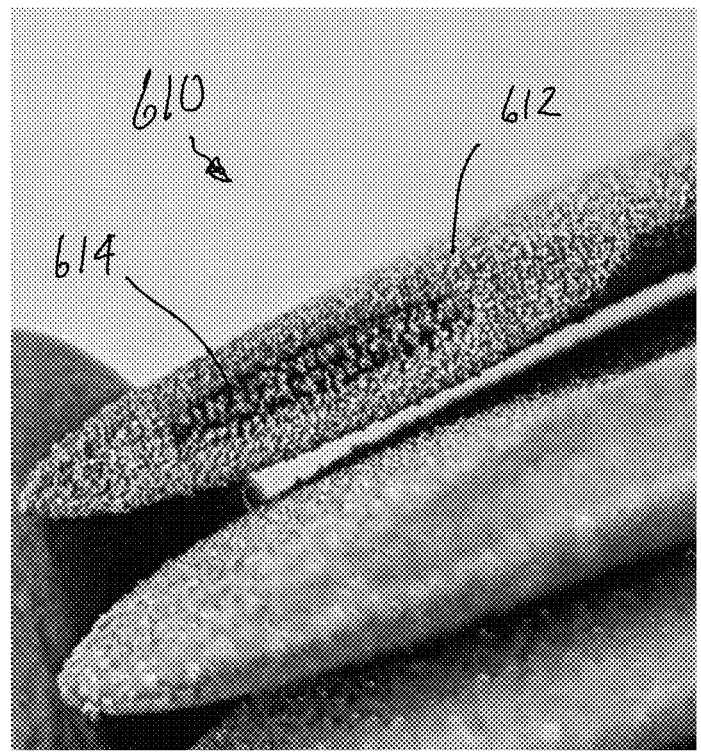
FIG. 8 is an enlarged view of an exemplary metallic helicoidal structure showing an internal wicking layer.

In yet another alternative embodiment intended for use as a heat pipe, the heat exchanger 10, 110, 210 and 310 may include internal microstructures that provide a wicking function or capillary action (See FIGS. 7 and 8). A conventional heat pipe includes a condenser section, an adiabatic section and an evaporator section. The working fluid is returned from the condenser section to the evaporator section by a wick (or a wicking layer). The wick relies on capillary action to move the liquid-phase working fluid from the condenser section to the evaporator section. In accordance with an embodiment of the present invention, the wick or wicking layer may be formed as an integral part of the additive manufacturing process. In some applications, the wick may be fabricated by forming elongated grooves along the inner surface of the tube-like structure 12, 112, 212 and 312 that are small enough to move a liquid fluid through capillary action. In other applications, the wick may include a mass of small finger-like projections that extend inwardly from the inner surface of the tube-like structure 12, 112, 212 and 312 that are small enough to move a liquid fluid through capillary action. In still other applications, the microstructures may be including a porous, powder-like layer (See, e.g., FIGS. 7 and 8). For example, in additive manufacturing processes that involve powder sintering, a partial sintering process can be applied along the inner surfaces of the tube-like structure 12, 112, 212 and 312 to leave behind a structure capable of providing effective capillary action. It should be understood that the described microstructures are merely exemplary and that the heat exchanger may be formed with essentially any internal microstructure capable of providing the desired level of capillary action taking into consideration, among other things, the surface tension of the working fluid and the surrounding pressure. Through the formation of an integral wicking layer, the present invention provides an effective process for manufacturing a heat pipe that is capable of providing thermal management in a range of applications including solid oxide fuel cells, industrial processes, HVAC&R, power generation, nuclear applications, and thermal management of electronic systems, including computing devices.

In yet another alternative embodiment, the external shape of the heat exchanger 10, 110, 210 and 310 may be selected, for example, to maximize heat transfer by convection and/or radiation, and/or to reduce drag of the external fluid, whether it be liquid or gas. For example, the external shape of the tube-like structure 12, 112, 212 and 312 may be designed to provide optimized heat transfer with an external fluid, such as an external fluid crossflow. The external shape may be selected to enhance heat transfer and/or reduce drag of the external fluid, and may be based, in part, on the thermal, physical and chemical properties, of the external fluid, as well as its temperature, flow rate and direction of flow relative to the heat exchanger. For example, in some applications, an elliptical or oval exterior shape may facilitate heat transfer and reduce drag relative to a circular shape. Elliptical and oval shapes are merely exemplary and other exterior shapes may be incorporated into alternative embodiments of the present invention. In some embodiments, the external shape of the helicoidal structure may vary along its length, for example, to change the heat transfer characteristics along the length of the heat exchanger. The external shape of the helicoidal structure may be formed as an integral part of an additive manufacturing method.

In another alternative embodiment, the heat exchanger 10, 110, 210 and 310 may include external microstructures that enhance or otherwise facilitate tailored heat transfer. For example, the external surface of the tube-like structure 12, 112, 212 and 312 may be textured and/or may include grooves and/or other surface features that have been predetermined to provide the heat exchanger 10, 110, 210 and 310 with improved performance. FIG. 13 is a representative cross-section of a heat exchanger 70 with texturing 72 on its external surface. In some applications where desirable, the external structures may include small surface shapes that make the surface hydrophobic.

In another aspect, the present invention provides a method for manufacturing a heat exchanger using additive manufacturing. Additive manufacturing permits the fabrication of heat exchangers with complex geometries that cannot reasonably be attained with conventional manufacturing methods. This not only enables the fabrication of heat exchangers that vary along their length in size, shape and other characteristics, but also allows for the direct and integral formation of other features as set forth herein. Further, additive manufacturing allows the heat exchanger to include regional or local variations, for example, in geometry and in internal and external surface features. As a result, the present invention facilitates the manufacture of heat exchangers with a range of benefits, such as increased heat transfer efficiency, high resistance to thermal fatigue, reduction in pressure drop, or conversely, pressurization of fluids when desired.

In accordance with this aspect of the present invention, a heat exchanger may be manufactured from essentially any material that is capable of use in additive manufacturing systems, such as polymeric, metallic, glass, ceramic or composite material structures. In some embodiments, the additive manufacturing process may include binder jetting, fused deposition, or energy-directed melting of metals, glasses, ceramics or composites. This is not an exhaustive list and it should be understood that other existing additive manufacturing system and new additive manufacturing system that may be developed in the future may be used to manufacture heat exchangers from a wide range of materials in accordance with the present invention. Because additive manufacturing makes it feasible to fabricate these structures with such a wide range of materials, it is possible to select materials that are suitable for specific operating conditions. In one embodiment, the method includes selecting materials for additive manufacture of the heat exchanger based, in part, on the temperatures of operation, and by the material's thermal conductivity, mechanical strength as well as chemical compatibility, corrosion, creep and fatigue resistance.

In one embodiment, the method includes the additive manufacture of a helicoidal heat exchanger. For example, heat exchangers 10, 110, 210, 310, 410, 510, 610 and 710 all include helicoidal geometries. The helicoidal configuration of the heat exchanger provides relatively high degree of axial elastic compliance. As a result of the helicoidal geometry, these heat exchangers exhibit resistance to strained thermal expansion and can prevent constrained thermal fatigue. Although helicoidal geometries can provide meaningful benefits, the present invention is not limited to heat exchangers that are helical in shape.

In connection with this method, the optimal heat exchanger design can be determined computationally using conventional heat exchanger modeling algorithms. Using well-established methods for computational fluid dynamics, thermo-structural analyses and topology optimization, it is possible to determine geometrical parameters for heat exchangers, including without limitation helicoidal heat exchangers, that would maximize heat transfer while optimizing other parameters, such as materials utilization, size and cost. The computational algorithms can be configured to take into account not only the internal fluid passing through the heat exchanger, but also any external fluid that may be passing over the exterior of the heat exchanger. For example, such analysis can be used to design the geometry of a heat exchanger for transferring heat from gas-to-gas, liquid-to-gas, super-critical-fluid to gas and super-critical-fluid to liquid among others.

In some applications, these conventional modeling algorithms can be used to provide an optimized heat exchanger in which the design varies along its length to provide enhanced heat transfer with reduced pressure drop. The modeling algorithms can be configured to model and evaluate any one or more of the features described herein, including internal and external texturing and other surface features.

Figure 5:
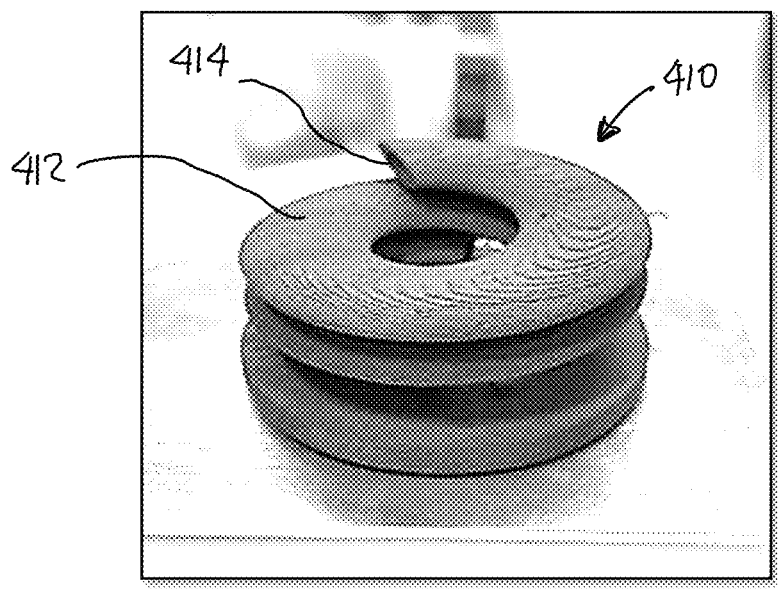
FIG. 5 is an image of an exemplary ceramic helicoidal structures fabricated by binder jetting of $B_4C$ and SiC particles followed by reactive silicon infiltration.

Fabrication of polymer, metal and ceramic helicoidal heat exchangers by additive manufacturing has been demonstrated. FIG. 5 is an example of a ceramic helicoidal structure manufactured from $B_4C$ and SiC particles. More specifically, FIG. 5 shows a helicoidal tubular structure 410 formed by the binder jetting process using an ExOne M-Flex machine, in which binder is selectively deposited onto a powderbed of silicon carbide and boron carbide particles. Powder for each layer was dispensed at 30 mm/s with an oscillator speed of 2600 rpm. The powder surface was leveled at 100 micron layer height with a counter-rotating ~40 mm roller traveling at 10 mm/s across the powderbed. The powder packing density was estimated to be 60% and a binder saturation of 80% was used. Following binder deposition, a set time of 10 sec was used before the heater passed over the surface at 10 mm/s. The heater output varied slightly for each layer to maintain the setpoint of 60 deg C. for the powderbed surface. Following additive manufacture, the structure 410 was subjected to silicon infiltration.

Figure 6:
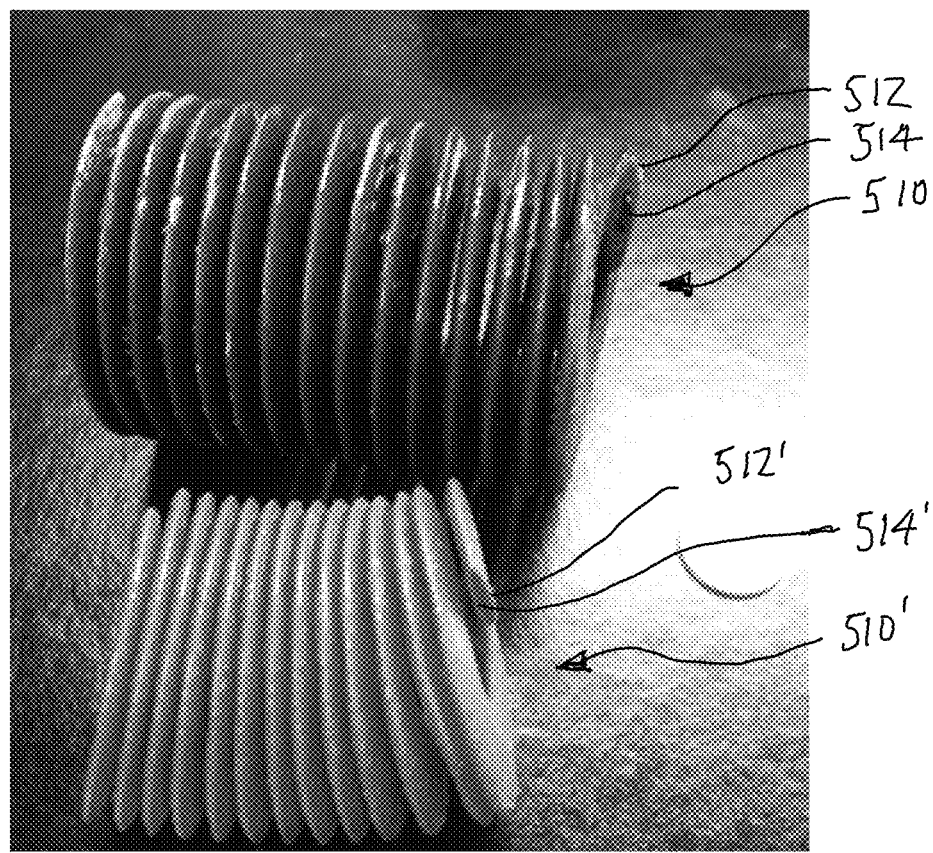
FIG. 6 is an image of two exemplary plastic helicoidal structures fabricated by fused deposition.

FIG. 6 shows examples of two plastic helicoidal structures. More specifically, FIG. 6 shows two helicoidal tubular structures 510 and 510' fabricated by fused deposition of Acrylonitrile Butadiene Styrene (ABS) and polylactic acid (PLA). ABS structures were fabricated in a MakerBot Replicator 2× using 0.7-mm diameter filament. The extruder was heated to 230° and the extrusion rate was 100% through a 0.4 mm nozzle. The slicer software was MakerBot Desktop using 0.20-mm layer heights and 25% infill with shells. PLA structures were printed in a Fusion F400S printer using 0.7-mm diameter PLA filament. The bed temperature was set to 40° C. and the Nozzle temperature was 220° C. The file was sliced using Simpyify3D software at a 0.2 mm layer thickness with 3 shells and a 100% filament feed rate. Print density was set to 55%.

FIGS. 7 and 8 are examples of metallic helicoidal structures fabricated by laser melt deposition of molybdenum. As noted above, in one aspect, the present invention provides a heat pipe that is provided with an internal wicking layer formed as an integral part of the additive manufacturing process. For example, additive manufacturing can be used to form an internal porous structure that is configured to provide capillary action to enable the transfer of working fluid from an evaporator section to a condenser section. FIGS. 7 and 8 are images of two helicoidal tubular structures 610, 610' that include an internal wicking layer 616 that may be suitable for use in the manufacture of a multiphase heat pipe. FIG. 7 includes images of two molybdenum helicoidal tubular structures 610 and 610' fabricated by laser melt additive manufacturing using a Renishaw Model 250 equipped with a 400 waW laser and 45 µm spherodized molybdenum powder with an average diameter of 45 µm. The laser exposure time was 200 milliseconds with 85 µm separation, a meander build strategy with 67° offset per layer and a layer thickness of 30 µm. FIG. 8 is an enlarged image of one end of molybdenum helicoidal tubular structure 610. In this embodiment, the helicoidal tubular structure 610 has a tube-like structure 612 defining an internal channel 614. The inner surfaces of the tube-like structure 612 are covered by internal microstructures that form a wick layer 616. In this embodiment, the wick layer 616 is formed by partial sintering of the powder along the inner surfaces. The partial sintering process leaves a porous, powder-based structure that is capable of moving a liquid-phase working fluid from a condenser section to an evaporator section through capillary action. In additive manufacturing processes that rely on powder beds, the additively manufactured part is typically subjected to a de-powdering process. In the case of metallic objects, the de-powdering process may include sand blasting or other similar actions to remove unattached or weakly attached particles. When applied to the partially-sintered inner surfaces of the tube-like structure 612, the de-powdering process removes the weakly attached particles leaving behind the porous, powder-based structure.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A method for manufacturing a heat exchanger, comprising the steps of:
    forming a tubular structure using an additive manufacturing process, the tubular structure being formed through successive deposition of material, the tubular structure being formed with an external surface and an inner surface, the inner surface defining an internal channel, wherein as an integral part of the additive manufacturing process at least one of the external surface and the inner surface is formed with surface features; and
    wherein the surface features are further defined as microstructures formed into a wicking layer on the inner surface, the wicking layer being configured such that it is capable of moving a working fluid through capillary action.

2. The method of claim 1 wherein the additive manufacturing process of the forming step is further defined as powder sintering; and
    wherein the forming steps includes partially sintering the powder along the inner surface, the partially sintered powder forming a porous structure capable of functioning as the wicking layer.

* * * * *